(12) United States Patent
Drake et al.

(10) Patent No.: US 11,373,548 B2
(45) Date of Patent: *Jun. 28, 2022

(54) METHOD OF MECHANICALLY TRANSLATING WRITTEN TEXT TO BRAILLE ON COMPUTER PROGRAMMED MACHINE USING MOTION HAPTIC STIMULATION TECHNOLOGY

(71) Applicant: Educational Media Consulting, LLC, Palmyra, VA (US)

(72) Inventors: Gerald Drake, Palmyra, VA (US); Doug Blair, Gordonsville, VA (US)

(73) Assignee: EDUCATIONAL MEDIA CONSULTING, LLC, Palmyra, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,688

(22) Filed: Feb. 28, 2020

(65) Prior Publication Data
US 2020/0202745 A1 Jun. 25, 2020

Related U.S. Application Data

(63) Continuation of application No. 16/058,860, filed on Aug. 8, 2018, now Pat. No. 10,692,400.

(60) Provisional application No. 62/542,530, filed on Aug. 8, 2017.

(51) Int. Cl.
G09B 21/00 (2006.01)
B41J 3/32 (2006.01)

(52) U.S. Cl.
CPC ......... G09B 21/004 (2013.01); G09B 21/001 (2013.01); G09B 21/003 (2013.01); B41J 3/32 (2013.01); G09B 21/00 (2013.01)

(58) Field of Classification Search
CPC .. G09B 21/004; G09B 21/003; G09B 21/001; G09B 21/00; B41J 3/32
See application file for complete search history.

(56) References Cited

U.S. PATENT DOCUMENTS

| 5,673,703 A | * | 10/1997 | Fisher | ................. A61B 5/0051 600/557 |
| 10,692,400 B2 | * | 6/2020 | Drake | ................. G09B 21/004 |
| 2010/0159423 A1 | * | 6/2010 | Hashizume | ............. G06F 3/016 434/114 |

(Continued)

*Primary Examiner* — Jack Yip
(74) *Attorney, Agent, or Firm* — Woods Rogers PLC; Nathan A. Evans

(57) ABSTRACT

The present invention is directed to a haptic system of rotating cylindrical shafts topped with caps to create a virtual sensation of Braille text by integrating a microprocessor with microdrive motors. The micro drive's shafts are crowned with plastic cylindrical caps, the top face of which are precisely flush or level with the device's display surface thereby emulating the standard diameter and feel of a Braille dot or Braille space in two dimensions. It is the rotation of the drive's shaft that spins the caps and simulates the sensation of a Braille dot that is felt with the fingertips. This sensation of a two dimensional rotating dot is the result of the top face of the capped shafts positioned flush with the device's display surface. Motors that alternate between rotating shafts and shafts at rest produce Braille cell dots and spaces, respectively.

5 Claims, 9 Drawing Sheets

(56) References Cited

U.S. PATENT DOCUMENTS

2015/0206453 A1* 7/2015 Yip ............... G09B 21/003
 434/113
2015/0379895 A1* 12/2015 Chari ............. G09B 21/004
 434/114

* cited by examiner

FIG. 2 (Sectional of FIG. 3)

Top View

Braille Cell Dimensions

The Letter "n" As Programmed

| [TRUE]  | [TRUE]  | ● ● |
| [FALSE] | [TRUE]  |   ● |
| [TRUE]  | [FALSE] | ●   |

FIG. 11

METHOD OF MECHANICALLY TRANSLATING WRITTEN TEXT TO BRAILLE ON COMPUTER PROGRAMMED MACHINE USING MOTION HAPTIC STIMULATION TECHNOLOGY

CROSS-REFERENCE TO RELATED APPLICATIONS

The present application relies on the disclosures of and claims priority to and the benefit of the filing date of U.S. Provisional Application No. 62/542,530, filed Aug. 8, 2017. This application is a continuation of U.S. application Ser. No. 16/058,860 filed Aug. 8, 2018. The disclosures of those applications are hereby incorporated by reference herein in their entireties.

FIELD OF THE INVENTION

The field generally relates to Braille systems and devices for blind and visually impaired individuals, and more particularly to electronic reader tablets for displaying Braille content.

BACKGROUND OF THE INVENTION

The present invention is directed to a haptic system of rotating cylindrical shafts topped with round caps to create a virtual sensation of Braille text by integrating a microprocessor (also referred to herein as microcomputer or processing unit or microprocessing unit) with motors (also referred to herein as micro motors, micro drives, or drives). Specifically, the present invention is directed to a system whereby coded text data is inputted to a microprocessor that regulates or otherwise instructs mechanical micro drives. The micro drive's shafts are, in aspects, crowned with plastic cylindrical caps the diameter of which is 1.44 mm, the standard diameter of conventional paper embossed Braille. The top face of the caps or tops of the shafts are disc-shaped and are positioned precisely or substantially flush or level with the device's display surface (also referred to herein as an output user interface), thereby emulating the standard diameter and/or feel of a Braille dot or Braille space in two or three dimensions. In aspects, precisely or substantially flush (or level) means allowing for variances that would be expected by one of ordinary skill in the art manufacturing the device, and/or flush to a degree that a Braille dot (or space) could be read and/or perceived by a user of the device. In certain embodiments, the Braille dots of the present invention are represented as flat discs, or in some cases may have texture. Unlike conventional embossed paper Braille or the current designs of refreshable Braille readers, the Braille dot's dimension for height is absent in the present invention. It is, in aspects, the rotation of the drive's shaft that spins the caps and simulates the sensation of a Braille dot that is felt with the fingertips. This sensation of a two dimensional rotating dot is the result of the top face of the capped shafts positioned flush or level with the device's display surface. A drive shaft/cap that is not spinning is at-rest and perceived as a Braille space. The spinning or at-rest caps, six to a cell, translate the coded text files into Braille text that can be read on an output user interface. In one embodiment, six caps are aligned in a two column-three row configuration to resemble a conventional Braille cell. The currently claimed Braille e-reader can display up to 1000 Braille cells or characters (e.g., such as letters, numbers, punctuations, symbols, indicators), or more or less, and is refreshable—that is, it advances the text to the next page(s) of Braille or returns to the previous page(s) on demand by, for example, toggling a navigation button on the device or using a voice command.

The present invention is expected to provide services and features to the blind and visually impaired that are currently available to users of Nooks and Kindle, by way of example. The advantages of Braille text displays (also referred to herein as a e-readers or reader tablets) over audio books for the visually impaired are significant. Braille text provides a user with a "physical" reading experience, an advantage because the individual can re-read and search surrounding words for contextual clues. When reading, a reader progresses at his own pace, and he decides on the pronunciation of character and place names. It is an active, not a passive experience. On the other hand, when listening to audio books, the narrator sets the pace and decides on pronunciations, and the listener hears the characters in the narrator's voice only. When the visually impaired read Braille, the scenes and characters of the narrative are more vibrant than listening to storytelling because the reader more fully engages their imagination to create the story. Reading Braille specifically stimulates both the visual and tactile cortex. When scientists taught sighted people to read Braille, a complex tactile task, they found that the activity activated the visual cortex as well as the tactile one. Most importantly, Braille books give the blind a greater opportunity for meditation and thinking while they read.

Currently, the price of Braille e-readers range from $3,500 to $15,000, depending on the number of characters displayed and the functionality of the device. This is a prohibitively expensive price structure for the visually impaired consumer group that largely is unemployed and is dependent on financial aid. Current technology used to build refreshable Braille displays is still dependent on the old model of creating a three dimensional haptic sensation for the user by employing electronic or pneumatic methods to raise and lower small plastic pins on a grid matrix, forming Braille characters. The method proposed herein is two dimensional, less complex in design, and more affordable. A fully operating device based on this technology is expected to cost as much as a medium priced smart phone. While refreshable Braille displays are already available, the current technologies are limited to the amount of text they can display, typically a single line of text. The current device will allow users to read entire pages of text. The bulkiness of bound paper Braille books, which often consist of several volumes to convert a single book of conventional typeface, makes it a challenge to carry them. This is especially a problem for educational textbooks when conventional text is translated to Braille. Buying published Braille "books" often takes many months to complete the transaction.

The invention described herein provides for refreshable Braille displays possible of being programmed and manufactured more efficiently and for much less money than currently available Braille e-readers, allowing for such technology to be more vastly disseminated to the visually-impaired community. Most refreshable Braille displays use piezoelectric actuation mechanisms to move the pins that generate dot displays denoting each character. The piezoelectric actuation mechanism cells require continuously applied voltage to move the pins up and down. The microdrives in the proposed device on draw voltage when they are turning.

Description of Related Art

The following prior art references are incorporated herein by reference.

U.S. Publication No. 2011/0111375:

Patented device 0111375 is a "single-unit portable Braille device according to claim 1, . . . each Braille cell including a plurality of electromechanically controlled pins, each pin being selectively raiseable and lowerable in response to electrical commands originating from the processing unit." User detects Braille characters through sensation of a three dimensional pin. The invention described in this application is directed to a system that regulates or otherwise instructs mechanical micro drives. The micro drive's shafts are, in aspects, crowned with 1.44 mm plastic cylindrical caps, the top face of which are precisely or substantially flush or level with the device's display surface (also referred to herein as an output user interface), thereby emulating the standard diameter and feel of a Braille dot or Braille space in two dimensions. It is, in aspects, the rotation of the drive's shaft that spins the caps and simulates the sensation of a Braille dot that is felt with the fingertips. This sensation of a two dimensional rotating disc is the result of the top face of the capped shafts positioned flush or level with the device's display surface. A drive shaft/cap that is not spinning is at-rest and perceived as a Braille space.

U.S. Publication No. 2012/0050172:

Abstract for 0050172 states invention is "a system and method for a touch display system. The a touch display system includes: a flat touch display assembly including a matrix of flat Braille pixels, wherein each flat Braille pixel is operable to be placed in one of two states. A heating source is selectively connected to each flat Braille pixel. A cooling source selectively connected to each flat Braille pixel. The flat Braille pixels are configured to represent images to touch by selective heating and cooling thereof."

The invention described in this application is directed to a system that regulates or otherwise instructs mechanical micro drives. The micro drive's shafts are, in aspects, crowned with 1.44 mm plastic cylindrical caps, the top face of which are precisely flush or level with the device's display surface (also referred to herein as an output user interface), thereby emulating the standard diameter and feel of a Braille dot or Braille space in two dimensions. It is, in aspects, the rotation of the drive's shaft that spins the caps and simulates the sensation of a Braille dot that is felt with the fingertips. This sensation of a two dimensional routing disc is the result, of the top face of the capped shafts positioned flush with the device's display surface. A drive shaft/cap that is not spinning is at-rest and perceived as a Braille space.

U.S. Publication No. 2015/0262509

Claim 11 for 0262509 states "11. The single-unit portable Braille device according to claim 1, wherein the refreshable Braille display comprises a linear array of one or more rows of adjacent Braille cells, each Braille cell including a plurality of electromechanically controlled pins, each pin being selectively raiseable and lowerable in response to electrical commands originating from the processing unit."

The invention described in this application is directed to a system that regulates or otherwise instructs mechanical micro drives. The micro drive's shafts are, in aspects, crowned with 1.44 mm plastic cylindrical caps, the top face of which are precisely flush or level with the device's display surface (also referred to herein as an output user interface), thereby emulating the standard diameter and feel of a Braille dot or Braille space in two dimensions. It is, in aspects, the rotation of the drive's shaft that spins the caps and simulates the sensation of a Braille dot that is felt with the fingertips. This sensation of a two dimensional rotating disc is the result of the top face of the capped shafts positioned flush or level with the device's display surface. A drive shaft/cap that is not spinning is at-rest and perceived as a Braille space.

U.S. Pat. No. 7,432,912

Abstract for U.S. Pat. No. 7,432,912 states the adaptation of a regular pocket size computer for use by a visually impaired person is provided . . . . The tactile keyboard includes a membrane having raised keys on one side and corresponding screen activating tips on the other. Conversely, the invention described in this application comprises a tablet or tablet computer with a tactile interface display and microprocessor that is approximately 11 inches wide and 11 inches tall, although the device may be smaller or larger.

U.S. Pat. No. 8,686,951

Claim for U.S. Pat. No. 8,686,951 describes an apparatus and method for providing and configuring an elevated, indented, or texturized display device is disclosed. Processes are also given involving elevated, indented, or texturized portions of a display device. By providing an elevated, indented, or texturized display device enhanced input/output functions are provided. The invention described in this application is directed to a system that regulates or otherwise instructs mechanical micro drives. The micro drive's shafts are, in aspects, crowned with 1.44 mm plastic cylindrical caps, the top face of which are precisely flush or level with the device's display surface (also referred to herein as an output user interface), thereby emulating the standard diameter and feel of a Braille dot or Braille space in two dimensions. It is, in aspects, the rotation of the drive's shaft that spins the caps and simulates the sensation of a Braille dot that is felt with the fingertips. This sensation of a two dimensional rotating disc is the result of the top face of the capped shafts positioned flush with the device's display surface. A drive shaft/cap that is not spinning is at-rest and perceived as a Braille space.

SUMMARY OF THE INVENTION

Braille is the written language of visually impaired readers who cannot see printed material. Readers of Braille are required to use their sense of touch by running a finger over a sequence of spaces and raised dots. A Braille character consists of six alternating spaces or nubs configured in a grid having three and two columns. By alternating the raised nubs with different combinations of the spaces within the cells, each alphanumeric character in English and other languages can be created. Traditional Braille has been created by embossing paper with arrays or cells of spaces and nubs, each cell representing a different alphabetical character or number.

Literacy—the ability to read and write—is vital to a successful education, career, and quality of life in today's world. Although learning to read and write in traditional ways may not be possible when you cannot see print on a page, there are many other paths to becoming literate. Learning to read and write in Braille can make a dramatic difference in the life of a visually impaired child or adult. Braille is an irreplaceable and modern method for literacy among the millions of visually impaired. Current refreshable Braille readers display only one line of text and therefore are not conducive to reading. The present invention is directed to 40 lines of 25 cells or characters.

In one embodiment of the present invention, a method is provided wherein written text, such as in PDF format, is input into a device, for example using a USB (Universal Serial Bus) port. The written text data is then input into a microprocessor, whereby the microprocessor translates the text into computer code, as explained in detail below. The resulting output data is sent to motors and the data informs the motors to create certain Braille characters. The motors thereby activate driveshafts which are aligned in a Braille pattern or cell. The micro drive's shafts are, in aspects, crowned with 1.44 mm plastic cylindrical caps, the top face of which are precisely flush or level with the device's display surface (also referred to herein as an output user interface), thereby emulating the standard diameter and feel of a Braille dot or Braille space in two dimensions. The Braille matches or approximates the written text input into the device.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 2 is a section rendering of the elevation rendering in FIG. 3.

FIG. 11 is an example of a programmed Braille character according to the invention described herein.

DETAILED DESCRIPTION OF THE INVENTION

Figure 1:
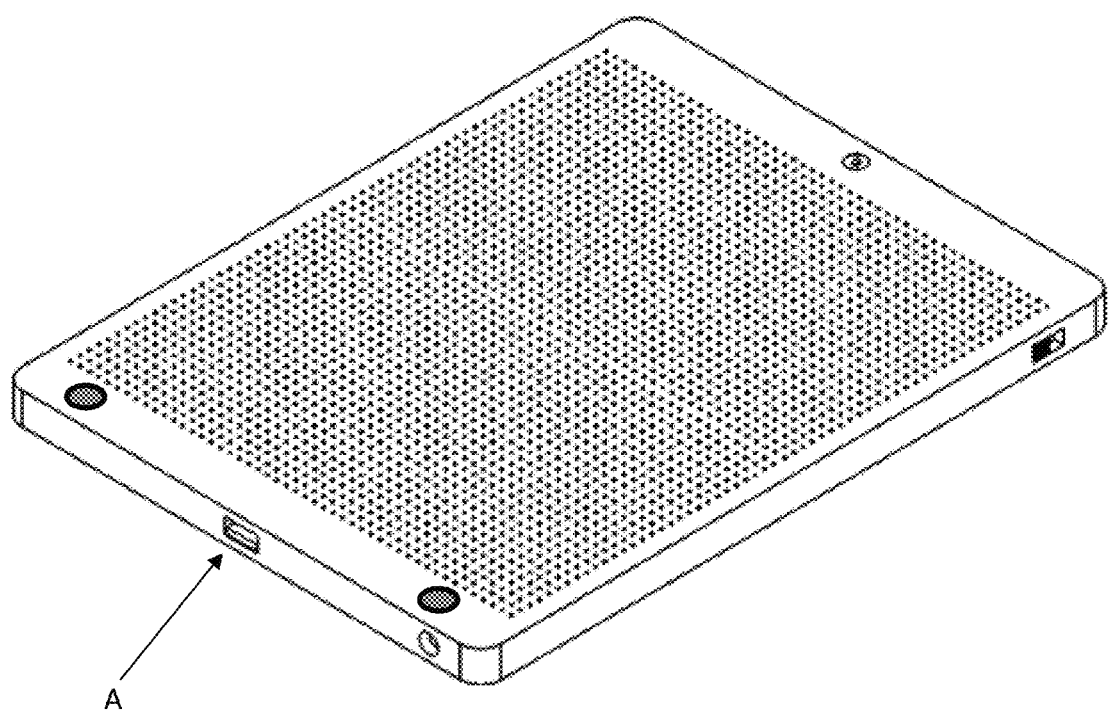
FIG. 1 is a perspective rendering of one possible embodiment of the device taught herein.

In the following description some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g. software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may be used in conjunction with the computer-executable code and electronic databases. The user interface may allow a user to perform these tasks through the use of Braille equivalents of text fields, check boxes, pull-downs, command buttons, and the like. A skilled artisan will appreciate how such features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The invention described herein provides for refreshable Braille displays possible of being programmed and manufactured more efficiently and less expensively than currently available Braille e-readers, allowing for such technology to be more vastly disseminated to the visually-impaired community. Most refreshable Braille displays use piezoelectric actuation mechanisms to move the pins that generate dot displays denoting each character. The piezoelectric actuation mechanism cells require continuously applied voltage to move the pins up and down. The microdrives in the proposed device when purchased in sufficient quantities cost less than one U.S. dollar per unit and draw voltage only when their shafts are spinning.

FIG. 1 is a rendering of the device comprising a tablet or tablet computer with a tactile interface display and microprocessor that is enclosed in a light-weight casing approximately 11 inches wide and 11 inches tall, although the device may be smaller or larger. FIG. 2 is a section view displaying the casing 1 and the micro drive motor mount assembly 2.

Figure 3:
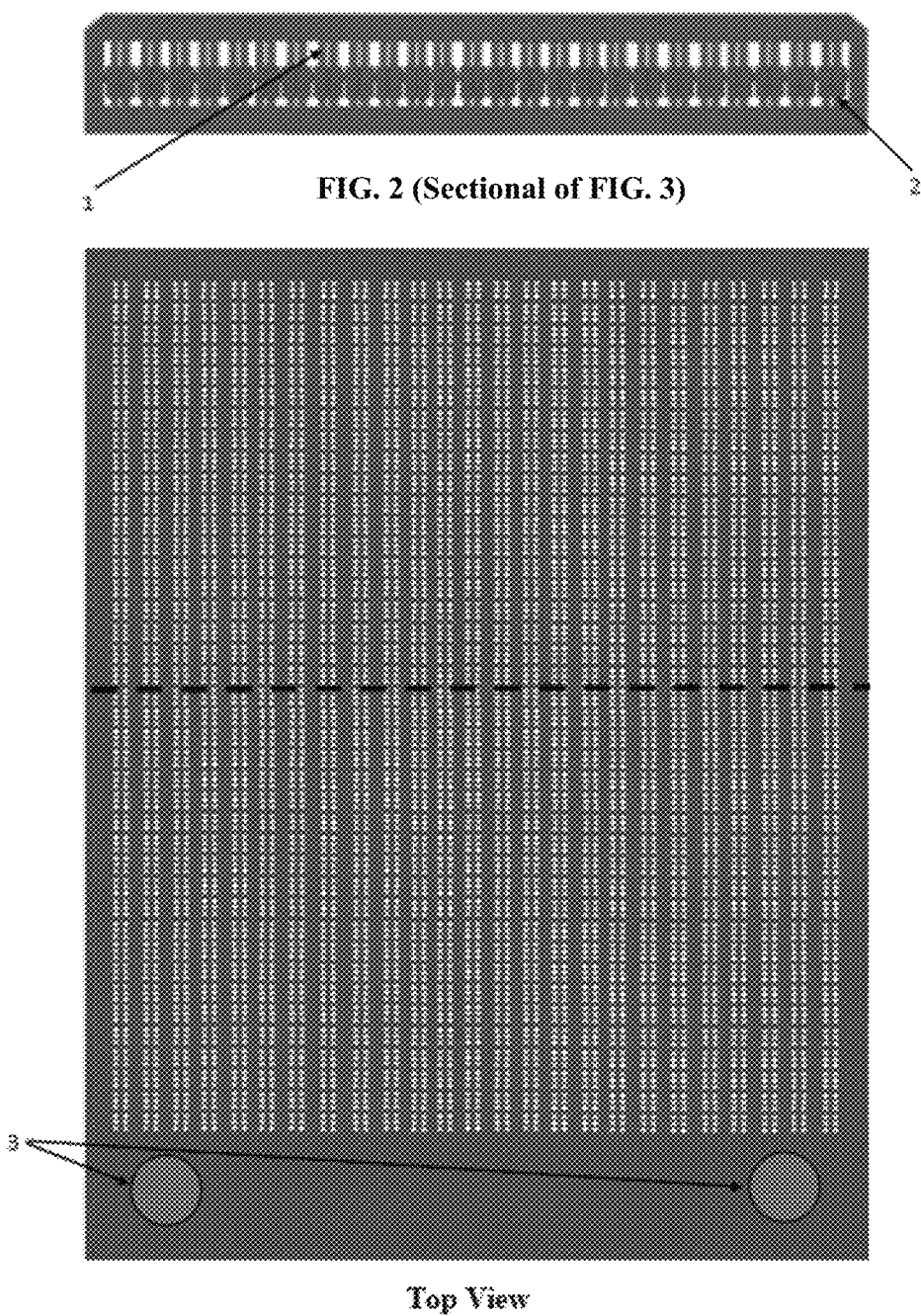
FIG. 3 is an elevation rendering of one possible embodiment of the device taught herein.

In FIG. 1, the device also comprises a means of inputting data A, such as by wired or wireless communication or an information port (e.g., a USB port or Bluetooth). It is approximately 1.5 inches thick but in some cases may be thinner or thicker. In FIG. 3, the tablet display may conform to the standard Braille cell configuration and cell array per page 4. In FIG. 3, each line may be 25 cells in length, with 40 lines per page, a total of 1000 cells. All lines may be counted from the top of the page, regardless of whether or not they contain Braille. The device may allow for more or less cells or characters. In addition to the 1000 cells of Braille, the device may comprise a speaker and a microphone for a built-in "intelligent assistant" that enables users to speak voice commands to operate the Braille device and its computer software applications (e.g., voice recognition software). In other aspects, the device may comprise internal or external batteries or power sources, sensors, cameras, memory, processors, means of communication, such as an antenna and wireless communication capabilities (e.g., Bluetooth and Wi-Fi). In FIG. 3, device has two page turning controls to advance or return a page 3.

Figure 4:
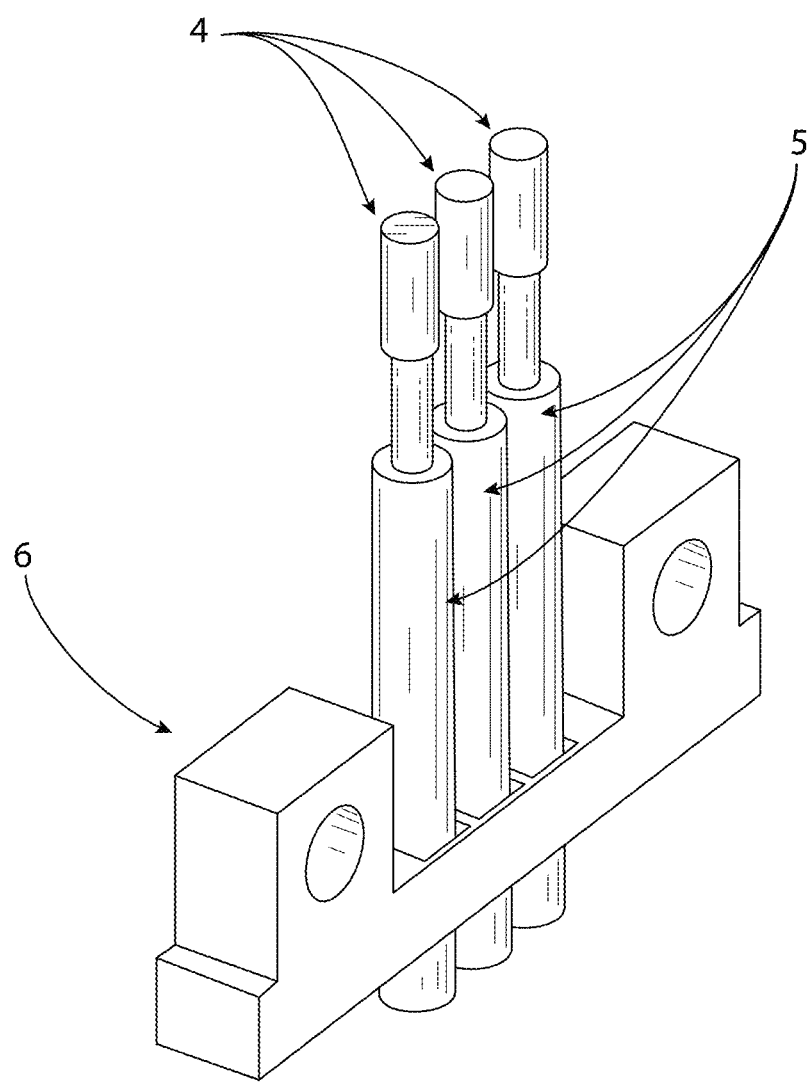
FIG. 4 is a perspective rendering of a motor assembly depicting the motor mount and three micro drive motors. Two assemblies are used to produce a six motor—six Braille dot cell.
Figure 5:
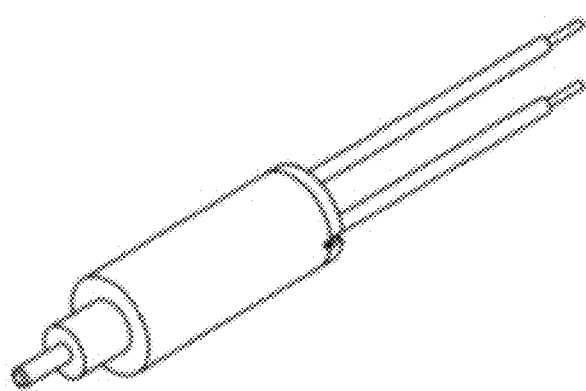
FIG. 5 is a perspective rendering of the micro drive motor.
Figure 6:
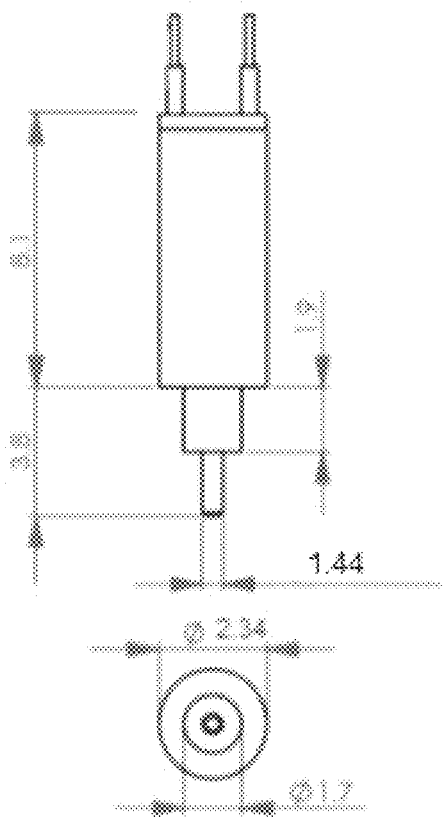
FIG. 6 is a two dimensional rendering of the micro drive motor with measurements.
Figure 7:
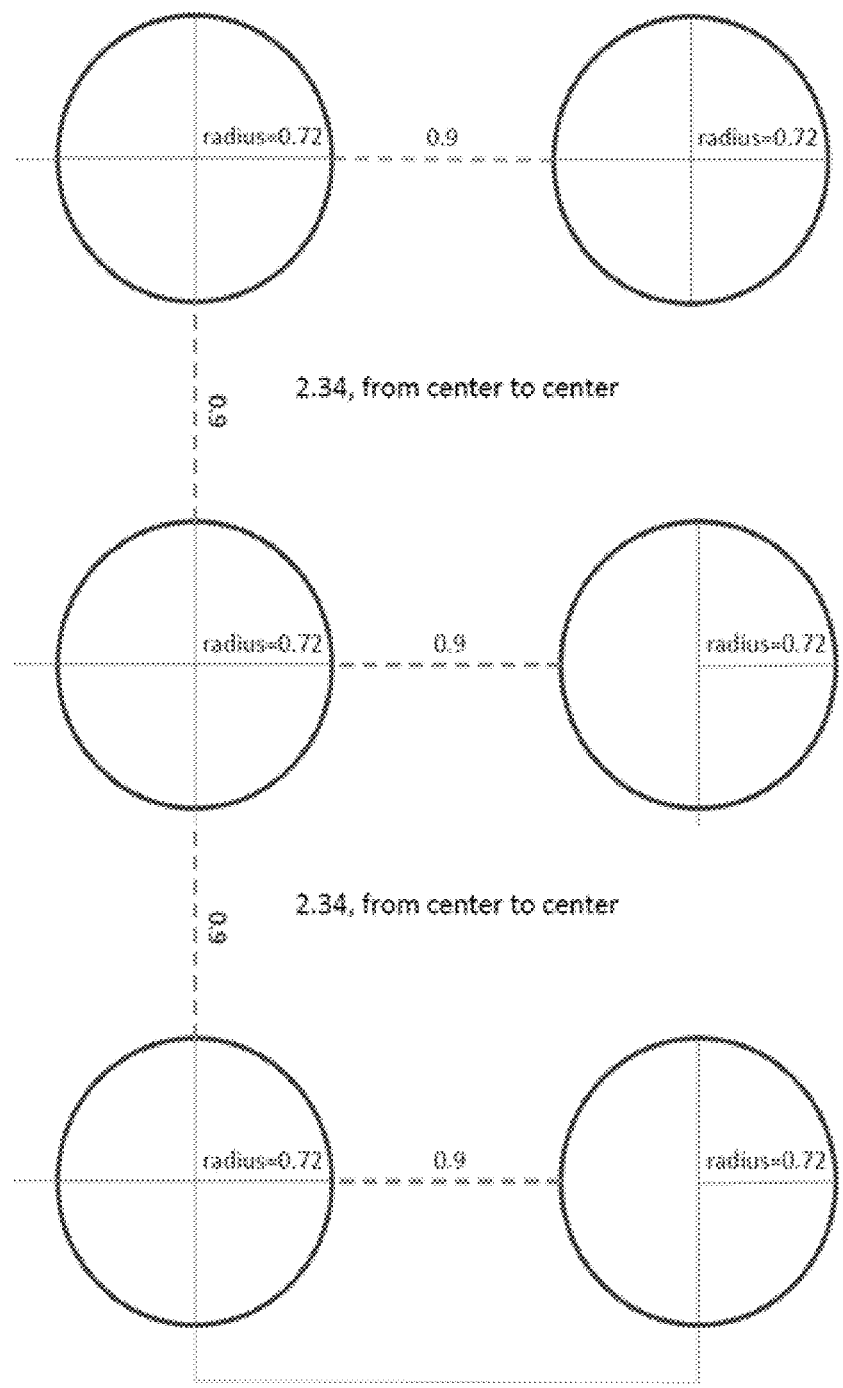
FIG. 7 is a rendering of a Braille cell with measurements.

In FIG. 4, a preferred embodiment, the Braille characters are created by shafts topped by 1.44 mm plastic caps 4 that are attached to micro drives. These caps may be made of other material in addition to plastic, and may be longer or shorter but will adhere to the standard diameter of Braille dots. Micro drive motors assemblies consist of mounts 6 and 3 individual motors 5. Two assemblies produce a conventional six dot Braille cell for the device.

In FIG. 4, when the device is turned on and translating written text to Braille, each micro drive 5 causes the cap to spin, or rotate. It is a user's cumulative experience of touching the spinning caps flush or level with the interface, which correspond to the Braille dots. When the caps are at rest, the users senses a space in the Braille cell. Dots and spaces combine to create the perception of a Braille alphanumeric character. By alternating spinning caps and caps at rest, the user will "read" the virtual, two-dimensional dots as a Braille character.

In certain aspects, the display will use sensors to detect when the device is in use. "In use" is defined as whenever the device is powered up and/or the user is reading Braille text on the tablet display (e.g., the user's hand or fingers are in contact with the display). When the device is "in use" mode the micro drives can be powered up. Whenever the user removes their hands from the display, the device will sense this and power down to save battery life.

The device, in embodiments, will have the capacity to store multiple books (or other documents) converted to PDF files, for example. Each PDF file will have metadata associated with it that identifies the title, author, publishing date, publisher, and summary using the voice of the intelligent assistant. The intelligent assistant, in aspects, will have the ability to search various online sources to acquire PDF versions of a library of classic and contemporary books, as well as magazines, newspapers, and scholarly journals.

Development of a Low Fidelity Prototype to Test Two Dimensional Braille Concept

Before submitting the patent application, the inventors built a low fidelity model of the device to prototype and test the concept of a two dimensional rotating disc serving as a Braille dot instead of the conventional three dimensional raised pin. A simple five Braille cell device was fabricated with 3D printing technology and "off-the-shelf" technology including microprocessors and microdrive motors. The intent was to have a blind subject use the prototype to determine if he or she could identify alphanumeric characters using the prototype's rotating microdrive shafts aligned in the standard two-dot column by three-dot row creating a conventional six dot cell. The subject was not told in advance what alphanumeric characters were to be displayed. The subject was a blind 28 year old employed by a state agency for the blind and visually impaired who taught Braille. The subject was able to promptly identify each character correctly in all attempts.

Computer-Implemented Method For Translating Written Text To Braille Characters

In one embodiment, a portable document format file is submitted to the microprocessor through an input in the device or via wireless communication (e.g., Bluetooth or Wi-Fi) or wired communication. The microprocessor converts the data with the file to Java bytecode, for example, although the invention is not limited to such computer enabled language. The bytecode is converted into plain text format that can be interpreted by the Java applet. The text is converted into two-dimensional Boolean arrays representative of Braille cells. The Braille cells format is outputted to actuators for the user to interpret by a tactile display on the device taught herein.

While the invention is not limited to Java programs, it is noted that most Java programs are not a single class. Rather, they are a collection of classes, interfaces, and their subcomponents, e.g., objects and methods, and how they connect to form the larger program. In the case of a preferred embodiment of the device described herein, the program is governed by a collection of 9 classes, as well as an interface that contains methods for the I/O (input/output) related classes, although more or less classes are envisioned.

The PDFIn class, which converts text from, for example, a PDF format, to a format read by Java, the invention works by exploiting the basic format of a PDF document. In the Portable Document Format, or PDF manner of encoding, there exists a group of PDF objects. These objects represent things like text bodies, images, tables, and special formatting. By recognizing certain streams of commands that contain specific trigger strings of text at the beginning and end, the invention specifically finds and interprets text streams. For example, the invention deciphers key information by looking at, by way of example, the following text stream:

BT

/F13 12 Tf 288 720 Td (ABC) Tj ET

In this aspect, the relevant information starts with BT and ends with ET, for "begin text" and "end text", respectively. There is also Tf for text font and Td for text draw (the location of the text), but, in this example, particularly important information precedes Tj. These commands can also be capitalized, i.e., E.G. or TJ, albeit such a format is used less frequently. This particular information is the actual text that will be translated to Braille.

In this case, if the program searches and recognizes just before (or potentially after) Tj, then, according to the invention, it finds the text that needs to be translated into something that Java could read correctly. In one example, when a PDF uses WIN encoding (Windows Encoding), then it will appear as ASCII (American Standard Code for Information Interchange). PDF files write the text within those parentheses as binary index values and there are multiple encoding formats. In order for it to be converted to a format that Java can read, first the invention decrypts those values.

According to the current method, PDFIn class parses through the index of binary values, pulling them as a binary stream and converting them to a hexadecimal format. By converting them to a hexadecimal format, they can now be processed as Java bytecode. Java bytecode is what the microprocessors, in one aspect of the current invention, reads when processing Java, and commands the device what to do with the Java code. By creating a scanner and reading an input stream from a PDF input, the device checks through all the hexadecimal values and verifies that they are valid UTF-16 (16-bit Unicode Transformation Format) encoding characters. If not, they are discarded. If they are valid UTF-16 characters, they are able to be translated into something that is legible text or Braille characters. When it is determined which characters are valid UTF-16 characters, they are converted from hexadecimal to Unicode 3.0, and then outputted as ASCII, a subset of Unicode. That is in order to output them as text to the next console. On the other hand, in order to manipulate them in a particularly preferable manner, the PDFIn class leaves them in a hexadecimal format and eliminates the hexadecimal values that are not valid UTF-16 characters. These hexadecimal values are something that Java can read, and so then they are sent to the next class within the Java program.

In the preferred embodiment, the other major input class is the Userin class, which takes user input from the device's hardware, and sends that off to govern the various systems, such as the act of controlling the speed of the Braille disc motor by turning a potentiometer. This may be accomplished based purely on the claimed hardware, but using software allows for finer control and monitoring over the speed.

The DataIO class, hereby referred to as the I/O class, takes information from some classes and outputs it to others. It is in colloquial terms, the "central hub" or "brain" of the entire program. It takes input from the Userin, PDFIn, and Word classes, and then outputs to both the Motor and translate classes depending on what input the DataIO class is receiving. To Translate, the DataIO class sends off an array containing the inputted hexadecimal values from the PDF that were processed by PDFIn. To Motor, the DataIO class sends the array of cell objects that it receives from the Word class, as well as any input from the UserIn class.

For all three of the aforementioned I/O related programs there is the IO interface. This interface lists commands that are held in common by all three classes in order to make communication between them more streamlined.

The Translate class takes the hexadecimal code, running a second check to make sure that the characters are UTC-16 valid, before then converting them to ASCII and sorting them into two different two-dimensional arrays, noting their character and position. One two-dimensional array is filled with any character that would represent a letter of the alphabet, both uppercase and lowercase. The other is filled with spaces, numbers, and special characters.

Next, in the preferred embodiment, the Letter class takes all input and sorts it into two categories, uppercase and lowercase. The positions are also noted and sorted into two more arrays. Afterwards, the class takes the letters and compares them to a table of two-dimensional Boolean arrays that represent Braille cells. The class then outputs two two-dimensional arrays, containing objects that are representative of the two-dimensional Boolean arrays needed, as well as their positions; one for uppercase and one for lowercase.

There is the Number class. The Number class takes input and sorts it into three categories: numbers, special characters, and spaces. The positions are also noted and sorted into three more arrays. After, the class takes the characters and also compares them to a table of two-dimensional Boolean arrays that represent Braille cells. The class then outputs three two-dimensional arrays, containing objects that are representative of the two-dimensional Boolean arrays needed, as well as their positions; one for numbers, one for spaces, and a third for special characters.

The Cell class takes the data from the Letter and Number classes, and then sorts them into a single two-dimensional array based on their positions, so that they are back to their original order. Once this original order is achieved, the Cell class takes the two-dimensional Boolean objects and converts them to cell objects, which are expressed in an easier format for the Word class to interpret as Braille cells. They are sent as a two-dimensional array to the Word class.

The Word class will then proceed to read all the values. When it reads, it will scan for sequences of characters that can be represented by Braille abbreviations, as well as inserting the different punctuation unique to Braille, e.g. characters that represent switching between letters and numbers, as well as uppercase letters. The cell objects will be shifted in an array list (different than an array in that it is dynamic rather than static in size), and this will be outputted along with an integer displaying the size of the list, back to the Data IO class, to send to the Motor class.

In one embodiment, the Motor class is responsible for handling the operation of, in one aspect, the planetary gear motors, also referred to herein interchangeably or separable as motors, micro motors, drives, micro drives, gears, or micro gears. The motors are arranged in a two-dimensional array, and when the Motor class receives data, it outputs the cell values to the motors sequentially. In essence, it controls the motors and their speed, whether they are on or off, need to be reset, or switched to a different value.

The system, while translating, is almost constantly working and all the classes within the program are almost constantly communicating in order to function. The system is able to dynamically function if the need arises, and with the simple push of a button, the motors and how they function can change drastically. On the other hand, the main operation program is only an aspect of the software. It operates within a microprocessor that uses different aspects to control the system.

In the preferred embodiment, the main Java program, hereby referred to as the program, will be running on a microcomputer running a Linux-based distribution such as Debian, due to it being considered user-friendly and manageable when it comes to software modifications. Linux distributions also tend to be lightweight, meaning they are relatively less taxing on the performance of the computer system. This means that the microprocessor will have more processing power to run the various operations and therefore have much faster response times. This will also mean that the system will be more responsive to the user and prevent delays in the switching of the motors, which could potentially affect ease of reading, should it occur. The Java program will be running and communicating to two other operations on the microprocessor. The microprocessor will also be connected to a microcontroller, which is performing the physical/electrical handling of the motor operation.

In the preferred embodiment, the Java program is the software that supports the microcomputer's basic functions, such as executing commands and controlling peripheral computer software applications. When a program runs, the microcomputer takes the bytecode and communicates it over a Bash script that is running through the console, that auto-runs when the microcomputer is turned on. The program performs this function by communicating to a separate Java program running a single class that launches an executable shell script in order to communicate with the Bash script. The Bash script communicates over Serial TTL (Transistor-Transistor Logic) to an Atmel based microcontroller, which would then perform the actual motor function. It would accomplish this by directly communicating through the use of the echo command. This Bash script would take all the on/off commands, the speed commands, and the positions, and then pass that on through the serial connection the microcontroller.

In the preferred embodiment, the microcomputer also manages a VNC (Virtual Network Computing) server within the device that allows for remote access, in the event software updates, tech support/troubleshooting, or user modification becomes necessary. This functionality allows a user with a computer or other device capable of remote desktop and an internet connection, to connect directly within the microcomputer and control it or update it from wherever the user is located, even remotely.

The microcontroller also takes commands related to the motors and handles the direct control necessary in order to operate the motors and have them function. In regard to this task, the microcontroller performs a serial read over the serial connection. It would also be running a PID (Proportional-Integral-Derivative) control loop in order to have the motors function at a constant speed with very little error. This in turn would allow the motors to have very little error between the speed that the computer registers their operation, as opposed to their true speed.

In the preferred embodiment, these programs will auto-run on the startup sequence of the microcomputer, and typical safeguards, known to those of ordinary skill in the art, will be in place to ensure that nobody is able to connect through VNC and close out of these programs. If that were to happen, it could prevent operation of the device until the restart. It is envisioned that administrator locks on the software would prevent editing any of the files without the proper passwords and extra permissions necessary in order to allow editing access In the preferred embodiment, the device comprises a folder and Bash script responsible for pulling the PDF file necessary for the operation of the entire device. For example, when a USB connection is made to the device, the Bash script will run commands to automatically pull a PDF file from the USB device and place it into the default folder, renaming it with a target name for the program to access, and overwriting the old file. Accordingly, the program always knows the name and location of the file that it is supposed to read. In turn, the program will be able to read this file through the PDFIn class and start the overall processes needed for the function of the motors.

When combined, the overall system and programs described herein work to create a tablet that can translate written text to Braille text. In a preferred embodiment, the tablet will accept PDF files and output them as Braille cells in the form of a tactile sensation through micro drives. On the inside, a microcomputer, microcontroller, and a circuit containing motors will perform the translation process, while on the outside, the interface, in one example, simply comprises a casing, a few control buttons, and various ports for I/O function. The end result is a highly functioning machine that helps to bring the vision-impaired into the digital age and more easily engage with written material.

In other aspects, within the Braille tablet, there will be a camera on the device. Running on the microcomputer will also be a small neural network that will be trained through machine learning to recognize what is human and what is not. Through a series of weighted values, and trial and error through testing, the computer will be "taught" to turn on the motors when the power switch is on. The device will turn off when a person is not using the device. This will allow the device to save on power consumption when it is not in operation. When the device's power switch is in the off position, however, the device will remain completely powered down, for example.

Figure 8:
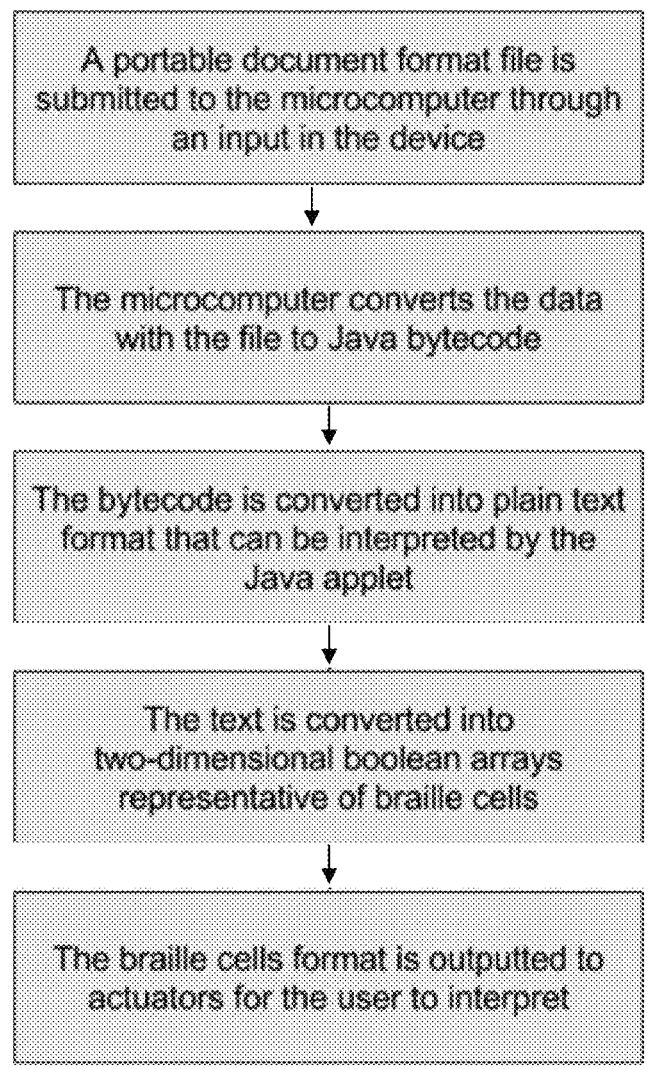
FIG. 8 is a flowchart depicting the method described herein.

FIG. 8 is a flowchart showing general steps comprising the method described herein. In particular, the first step is to input a portable document format type (e.g., PDF) through, for example, an input on the device, such as a USB port. Next, the microprocessor associated with the device converts the file data to Java bytecode. Next, the bytecode is converted into a plain text format that can be interpreted by the Java applet. Next, the text is converted into two dimensional Boolean arrays representative of Braille cells. Finally, the Braille cell's format is outputted to actuators for the user to interpret.

Figure 9:
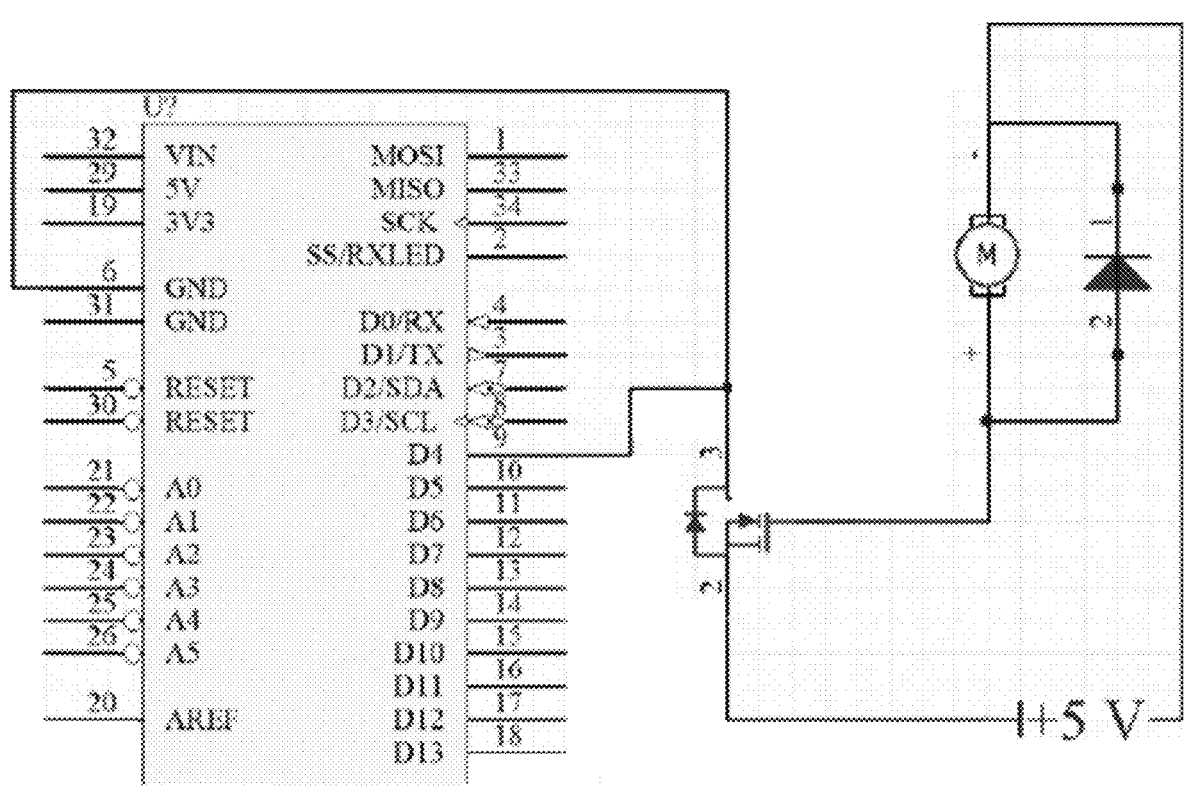
FIG. 9 is a flowchart depicting the method described herein.

FIG. 9 is flowchart showing a walk through the Java software processes of the invention described herein.

Figure 10:
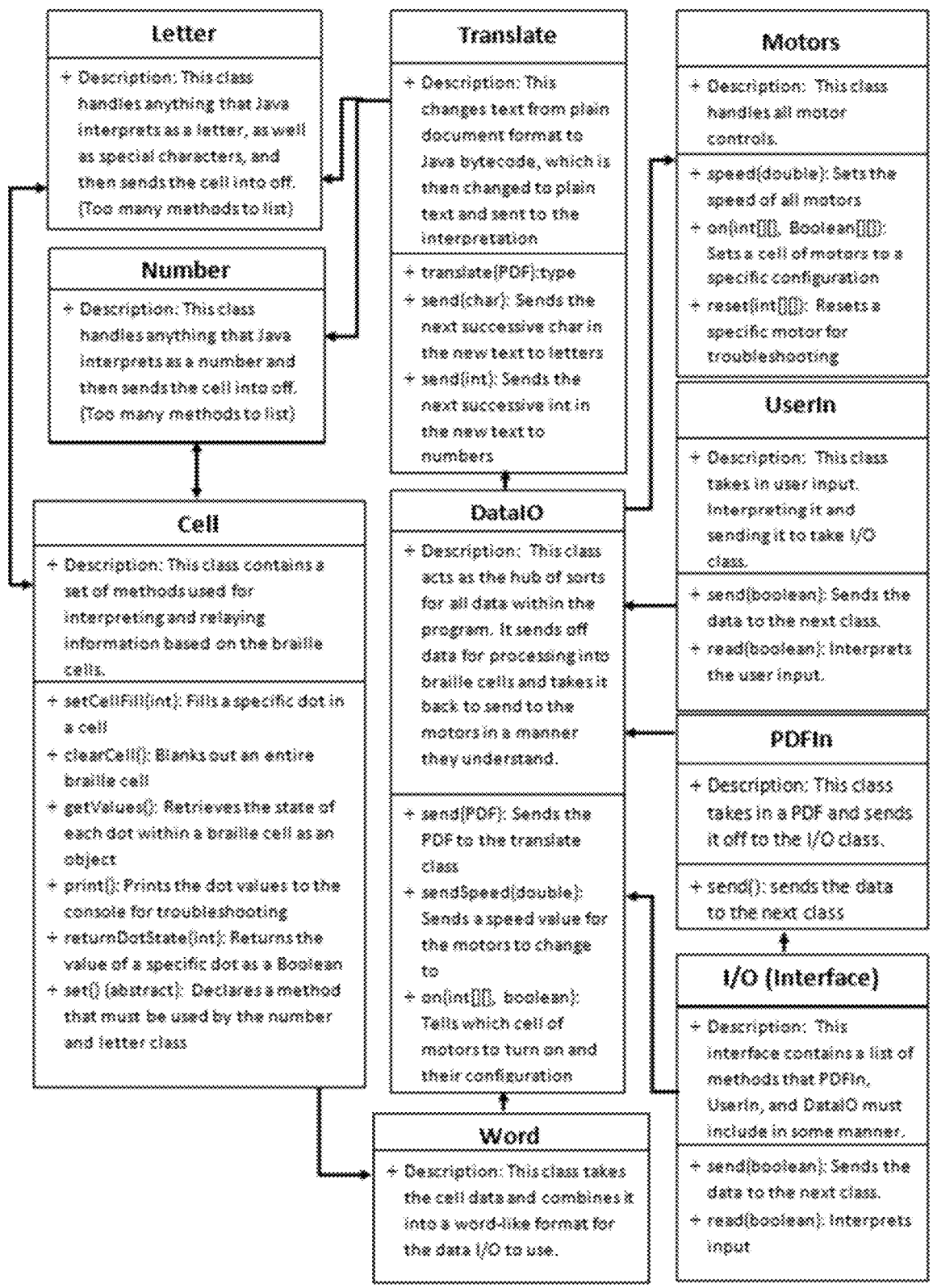
FIG. 10 is an example showing how the method determines which dots are activated to represent a Braille character.

FIG. 10 is a diagram showing the electrical circuit for a single motor.

FIG. 11 is an example of the analog between 2-dimensional Boolean arrays and Braille characters, in this particular example, the letter "n."

EXAMPLE

After powering on the Braille tablet, the process begins when the user inserts a USB source into the device and turns the device on. When this happens, the fetch script on the microcomputer grabs the most recent PDF file (based on the time stamp), renames it to TARGET, and places it into a folder bearing the same name, except in lowercase form instead. Once this occurs, the Java program starts the process of translating the text, although Java would have been running as soon as the device is powered on. The PDFIn class searches for a file named TARGET in the target folder, and as soon as the PDF is located it would access it. Next, the program searches through the ASCII portions of the text in order to determine what type of encoding it uses to determine how to decode it. Afterwards, it would then search for key aspects of the raw hex code of the PDF and find the binary index representing the text. In the case of the classic programming "hello world!" if it was in ASCII85 encoding, it would appear as:

<~BOu!rD]j7BEbo80~>

The PDFIn class would then convert it into a hexadecimal format, so that it would be legible by the Java Runtime Environment, and it would then proceed to appear as:

68656c6c6f20776f726c6421

Then, Java would check if this is a valid UTF-16 sequence, and then send it off to the DataIO class. The DataIO class would then recognize this as a hexadecimal value and sort it before sending it off to the Translate class. The Translate class would then proceed to run a second check on the hexadecimal value to make sure that it is a valid UTF-16 value. Afterwards, it would be converted into a two-dimensional array with position values that would look something like this:

{h, e, l, l, o, , w, o, r, l, d, !}

{0, 1, 2, 3, 4, 5, 6, 7, 8, 9, 10, 11}

The two-dimensional array would then be split into two smaller two-dimensional arrays, one for letters and one for everything else. After the sorting, it would appear as:

{h, e, l, l, o, w, o, r, l, d}

{0, 1, 2, 3, 4, 6, 7, 8, 9, 10} and

{, !}

{5, 11}

The first of the arrays would be sent to the Letter class, while the other would be sent to the Number class. Once that happens, each respective class would take their arrays that they received and output an array of cell objects with position values to the Cell class. For a character like the letter 'h,' the cell data might resemble Cell(true, false, true, true, false, false, 0). The Cell class would then take all of these objects and positions from both classes and use the position values to put them back in order, so the previous object is followed by (true, false, false, true, false, false, 1) and so on and so forth. Then the Word class would search for any patterns, abbreviations, or special punctuation and insert it as needed in order to make the Braille properly formatted. After being sorted in an array list, these cell objects would be sent to the DataIO class, which would then send it to the Motor class. The Motor class would convert each cell object to a Boolean array, and then assign it to a series of 6 motors. So 'h' would become:

{true, false}

{true, true}

{false, false}

If true indicates the presence of a dot, and false marks the absence of a dot, the Motor class sees an exact copy of the Braille cell, such as for 'h,' which is ⠓. The Motor class then sends commands for the specified set of motors to turn on in that formation, and so the command is sent off through an echo to the Bash script, which then passes it on to the microcontroller. The microcontroller then proceeds to turn the specified motors on, and the motors in the aforementioned formation turn on at the speed specified by the Userin class, which traveled the same path as the Braille text, but skipping the large loop and going straight from DataIO to the Motor class. When this occurs, the user would be able to feel the motors functioning by rotating in this pattern: ⠓⠑⠇⠇⠕ ⠺⠕⠗⠇⠙⠖

If an issue arose during this process, a user could connect via their computer using VNC and access the device through remote desktop, allowing them to fix any problems. Once everything is running, the device will remain on, but, in one aspect, will disable the operation of any motors when a camera or sensor (running alongside its own neural network program, which has been taught to recognize the characteristics of a human being) fails to validate the presence of a human user. Once at this point, the user would be able to push buttons on the device akin to flipping pages in order to get to the next bit of text. The PDF would remain until someone places a new PDF onto the USB source and inserts it back into the device.

One skilled in the art will recognize that the disclosed features may be used singularly, in any combination, or omitted based on the requirements and specifications of a given application or design. When an embodiment refers to "comprising" certain features, it is to be understood the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A motorized device comprising:
a computer processing unit;
a plurality of motors or micro drives connected to a plurality of shafts, wherein each top of the plurality of shafts is crowned with or connected to a cylindrical cap, wherein a top of each cylindrical cap is flush with a display surface of the motorized device, wherein the plurality of motors or micro drives are capable of making the plurality of shafts and the cylindrical caps spin, wherein the spinning cylindrical caps are capable of providing a tactile pattern on the display surface of the motorized device while remaining flush with the display surface of the motorized device.

2. The motorized device of claim 1, wherein the plurality of shafts are crowned with or connected at the top(s) to 1.44 mm cylindrical caps.

3. The motorized device of claim 1, wherein the plurality of shafts are configured in a 2 column by 3 row configuration, and wherein the configuration simulates a size and/or dimensions of Braille dots and/or Braille cells embossed on paper or another surface.

4. The motorized device of claim 3, wherein the Braille cells are configured in a 25 column by 40 row array, and wherein the 25 column by 40 row array produces a 1000 cell user interface.

5. The motorized device of claim 1, wherein the display surface is capable of providing Braille for one or more pages of conventionally displayed print or pixel text.

* * * * *